(12) United States Patent
Uchino et al.

(10) Patent No.: US 9,485,005 B2
(45) Date of Patent: Nov. 1, 2016

(54) MOBILE STATION AND RADIO BASE STATION

(71) Applicant: NTT DOCOMO, INC., Tokyo (JP)

(72) Inventors: Tooru Uchino, Tokyo (JP); Anil Umesh, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 13 days.

(21) Appl. No.: 14/384,512

(22) PCT Filed: Mar. 13, 2013

(86) PCT No.: PCT/JP2013/056977
§ 371 (c)(1),
(2) Date: Sep. 11, 2014

(87) PCT Pub. No.: WO2013/137303
PCT Pub. Date: Sep. 19, 2013

(65) Prior Publication Data
US 2015/0036593 A1 Feb. 5, 2015

(30) Foreign Application Priority Data
Mar. 13, 2012 (JP) ................................. 2012-055767

(51) Int. Cl.
*H04B 7/155* (2006.01)
*H04W 12/02* (2009.01)
*H04W 12/10* (2009.01)
*H04W 76/02* (2009.01)
(Continued)

(52) U.S. Cl.
CPC ............. *H04B 7/155* (2013.01); *H04W 12/02* (2013.01); *H04W 12/10* (2013.01); *H04W 36/0033* (2013.01); *H04W 76/028* (2013.01); *H04W 80/02* (2013.01)

(58) Field of Classification Search
CPC .............................. H04W 12/02; H04B 7/155
See application file for complete search history.

(56) References Cited

U.S. PATENT DOCUMENTS 8,335,189 B2 * 12/2012 Wang .................... H04W 12/02
 370/331
8,352,838 B2 * 1/2013 Komatsu ............... H04L 1/1642
 714/776
(Continued)

FOREIGN PATENT DOCUMENTS

| JP | 2011-061364 A | 3/2011 |
|---|---|---|
| WO | 2009/058903 A1 | 5/2009 |
| WO | 2009/070576 A2 | 6/2009 |

OTHER PUBLICATIONS

International Search Report issued in PCT/JP2013/056977 mailed on Apr. 23, 2013 (2 pages).
(Continued)

*Primary Examiner* — Brian D Nguyen
*Assistant Examiner* — Toan Nguyen
(74) *Attorney, Agent, or Firm* — Osha Liang LLP

(57) ABSTRACT

In order to prevent a mismatch between an HFN used by a PDCP layer on a transmitting side and an HFN used by a PDCP layer on a receiving side, and thereby to avoid a decrease in the throughput due to a failure in deciphering processing on PDCP-PDU in the PDCP layer on the receiving side. In a mobile station UE according to the present invention, a transmission unit 13 is configured to, if an HFN report trigger is detected, send a radio base station eNB the HFN or COUNT value most recently used in the deciphering processing on a PDCP-PDU.

2 Claims, 5 Drawing Sheets

(51) Int. Cl.
*H04W 36/00* (2009.01)
*H04W 80/02* (2009.01)

(56) References Cited

U.S. PATENT DOCUMENTS

| | | | | |
|---|---|---|---|---|
| 8,379,855 B2* | 2/2013 | Kubota | ............... | H04L 1/1607 380/247 |
| 8,416,678 B2* | 4/2013 | Yi | ..................... | H04L 63/12 370/216 |
| 8,743,905 B2* | 6/2014 | Ray | ................. | H04L 63/0428 370/389 |

OTHER PUBLICATIONS

Nokia Siemens Networks et al.; "Extended PDCP PDU formats"; 3GPP TSG-RAN WG2 Meeting #69, R2-101257; San Francisco, USA; Feb. 22-26, 2010 (3 pages).
3GPP TS 36.322 V9.3.0; "3rd Generation Partnership Project; Technical Specification Group Radio Access Network; Evolved Universal Terrestrial Radio Access (E-UTRA); Radio Link Control (RLC) protocol specification (Release 9)"; Sep. 2010 (39 pages).
3GPP TS 36.323 V10.1.0; "3rd Generation Partnership Project; Technical Specification Group Radio Access Network; Evolved Universal Terrestrial Radio Access (E-UTRA); Packet Data Convergence Protocol (PDCP) specification (Release 10)"; Mar. 2011 (26 pages).
Search Report issued in corresponding European Application No. 13760413.8, mailed Sep. 28, 2015 (6 pages).
Nokia Siemens Networks et al.; "Extended PDCP PDU formats"; 3GPP TSG-RAN WG2 Meeting #69bis, R2-102101; Beijing, P. R. China; Apr. 12-16, 2010 (3 pages).
Qualcomm Europe; "Risks with the PDCP Flush timer"; 3GPP TSG-RAN WG2 Meeting #63, R2-083866; Jeju Island, Korea; Aug. 18-22, 2008 (8 pages).
Notification of Reasons for Refusal issued in the counterpart Japanese Patent Application No. 2012-055767, mailed May 17, 2016 (6 pages).

* cited by examiner

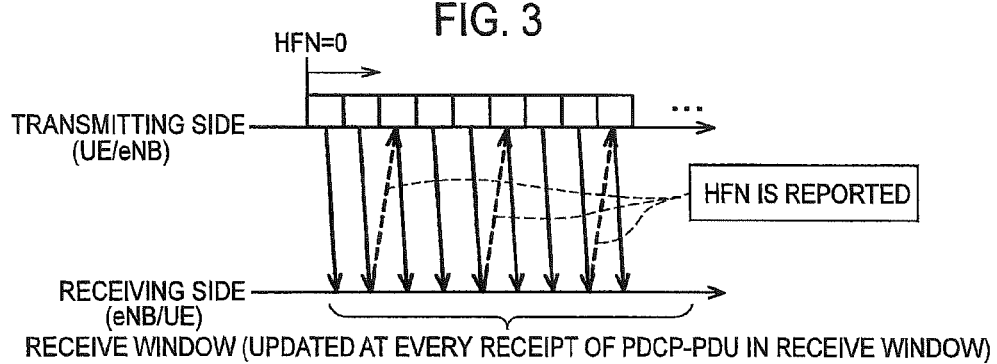
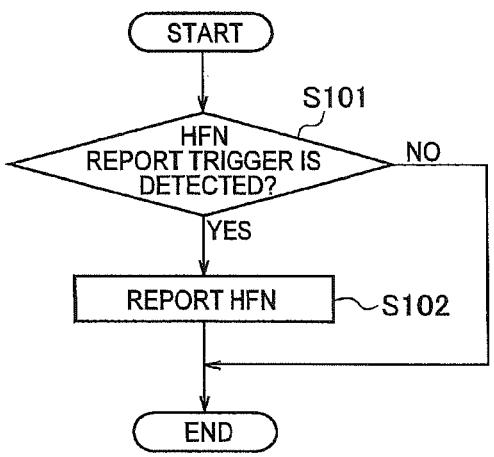
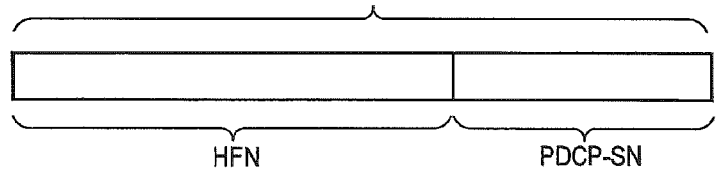
Prior Art

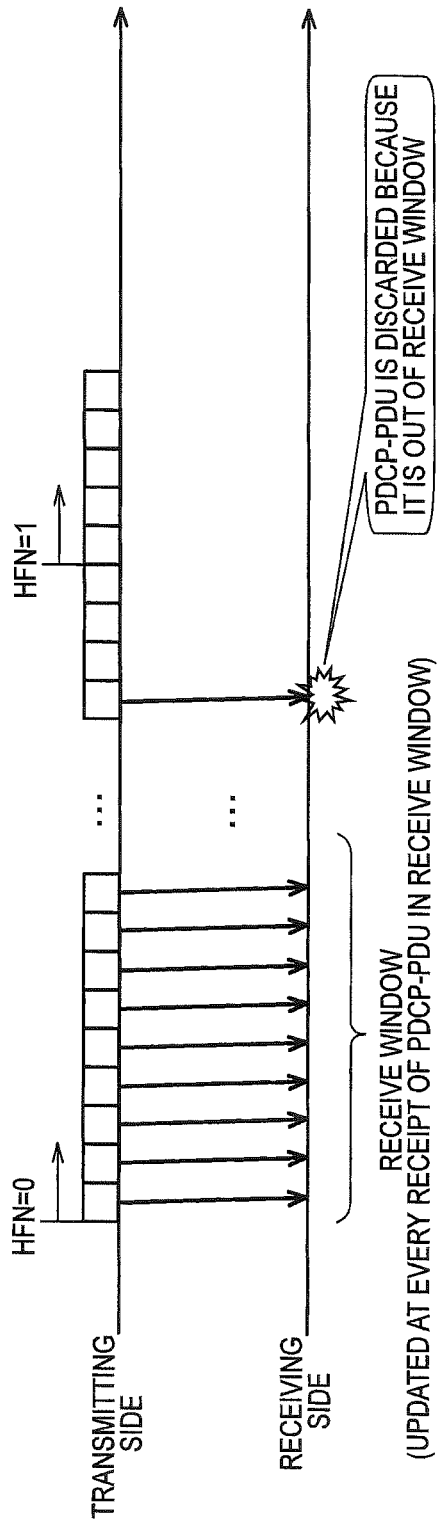

Prior Art

MOBILE STATION AND RADIO BASE STATION

TECHNICAL FIELD

The present invention relates to a mobile station and a radio base station.

BACKGROUND ART

In LTE (Long Term Evolution)-Advanced, a PDCP (Packet Data Convergence Protocol) layer is provided in mobile stations UE and radio base stations eNB.

The PDCP layer on a transmitting side is configured to perform ciphering processing and tampering detection processing on PDCP-SDUs (Service Data Units) received from a RRC (Radio Resource Control) layer by using COUNT values, and to transmit PDCP-PDUs (Protocol Data Units) given PDCP-SNs (Sequence Numbers) as headers to a RLC (Radio Link Control) layer.

In this respect, as illustrated in FIG. 5, the COUNT value is composed by an HFN (Hyper Frame Number) and a PDCP-SN.

Here, the PDCP-SN has 12 bits (or 7 bits), and is configured to be incremented every time a PDCP-PDU is generated and transmitted to the RLC layer. Meanwhile, the HFN has 20 bits (or 25 bits) and is configured to be incremented every time a cycle of the PDCP-SNs completes.

On the other hand, the PDCP layer on the receiving side is configured to perform the deciphering processing and tampering detection processing by using the COUNT values.

Specifically, as illustrated in FIG. 6, the PDCP layer on the receiving side is configured to discard a received PDCP-PDU if the PDCP-SN given as the header to the PDCP-PDU is out of a receive window.

On the other hand, the PDCP layer on the receiving side is configured to, if the PDCP-SN given as the header to a received PDCP-PDU is within the receive window, perform the deciphering processing and tampering detection processing on the PDCP-PDU by using the aforementioned COUNT value and update the receive window.

Moreover, if a handover procedure or a reconnection procedure is activated as illustrated in FIG. 7, the PDCP layer on the transmitting side is configured to retransmit PDCP-PDUs (FIG. 8, PDCP-PDUs #2-#8) to the mobile station UE after completion of the handover procedure or the reconnection procedure as illustrated in FIG. 8. Note that the PDCP-PDUs retransmitted herein are PDCP-PDUs multiplexed on an RLC-PDU for which the successful delivery has not been confirmed in the RLC layer, and all the following PDCP-PDUs.

On the other hand, the PDCP layer on the receiving side is configured to update the receive window according to a result of the receipt of the RLC-PDU on which the PDCP-PDUs are multiplexed, as illustrated in FIGS. 7 and 8.

PRIOR ART DOCUMENT

Non-Patent Document

Non-patent document 1: 3GPP TS36.322
Non-patent document 2: 3GPP TS36.323

SUMMARY OF THE INVENTION

The present inventor, however, has found that the current PDCP layer in LTE-Advanced has the following problem.

For example, as illustrated in FIG. 9, in the case where the handover procedure or the reconnection procedure is activated, the PDCP layer on the transmitting side transmits 4096 PDCP-PDUs ciphered by using the COUNT value with "HFN=0" while multiplexing the 4096 PDCP-PDUs on a single RLC-PDU. If detecting a success in receipt of the RLC-PDU, the PDCP layer on the receiving side updates the receive window from "HFN0, PDCP-SN:0 to 2047" to "HFN:1, PDCP-SN:0 to 2047."

Thereafter, when the handover procedure or the reconnection procedure is completed, the PDCP layer on the transmitting side performs ciphering processing using the COUNT value composed by "HFN=0" on the PDCP-PDUs multiplexed on the RLC-PDU for which the successful delivery has not been confirmed in the RLC layer, and all the following PDCP-PDUs, and then transmits the ciphered PDCP-PDUs. In this case, however, the PDCP layer on the receiving side fails in the deciphering processing on the PDCP-PDUs due to a mismatch between the HFN used in the PDCP layer on the transmitting side and the HFN used in the PDCP layer on the receiving side.

The present invention has been made in view of the problem described above and an objective thereof is to provide a mobile station and a radio base station capable of preventing a mismatch between an HFN used in the PDCP layer on the transmitting side and an HFN used in the PDCP layer on the receiving side, and thereby to avoid a decrease in the throughput due to a failure in deciphering processing on the PDCP-PDUs in the PDCP layer on the receiving side.

A first feature of the present invention is a mobile station including: a receiver unit configured to receive a PDCP-PDU with a PDCP-SN added as a header at a PDCP layer from a radio base station; and a transmitter unit configured to transmit the PDCP-PDU at the PDCP layer to the radio base station. The receiver unit is configured to, if the PDCP-SN added as the header to the received PDCP-PDU exists in a receive window, perform deciphering processing on the PDCP-PDU by using a COUNT value composed by an HFN and the PDCP-SN, and the transmitter unit is configured to, if a predetermined trigger is detected, send the radio base station the HFN or the COUNT value most recently used in the deciphering processing on the PDCP-PDU.

A second feature of the present invention is a mobile station including: a receiver unit configured to receive a PDCP-PDU with a PDCP-SN added as a header at a PDCP layer from a radio base station; and a transmitter unit configured to transmit the PDCP-PDU at the PDCP layer to the radio base station. The receiver unit is configured to, if the PDCP-SN added as the header to the received PDCP-PDU exists in a receive window, perform deciphering processing on the PDCP-PDU by using a COUNT value composed by an HFN and the PDCP-SN. The receiver unit is configured to, if the PDCP-SN added as the header to the received PDCP-PDU exists in a receive window, perform deciphering processing on the PDCP-PDU by using a COUNT value composed by an HFN and the PDCP-SN, and the transmitter unit is configured to, if a predetermined trigger is detected, send the radio base station the HFN or the COUNT value to be used in the deciphering processing on the next PDCP-PDU.

A third feature of the present invention is a mobile station including: a receiver unit configured to receive a PDCP-PDU with a PDCP-SN added as a header at a PDCP layer from a radio base station; and a transmitter unit configured to transmit the PDCP-PDU at the PDCP layer to the radio base station. The receiver unit is configured to, if the PDCP-SN added as the header to the received PDCP-PDU exists in a receive window, perform deciphering processing on the PDCP-PDU by using a COUNT value composed by an HFN and the PDCP-SN. The receiver unit is configured to, if the PDCP-SN added as the header to the received PDCP-PDU exists in a receive window, perform deciphering processing on the PDCP-PDU by using a COUNT value composed by an HFN and the PDCP-SN, and the transmitter unit is configured to, if a predetermined trigger is detected, send the radio base station the HFN or the COUNT value to be used in the deciphering processing on the PDCP-PDU with the PDCP-SN assigned to a lower edge or upper edge of the receive window.

A fourth feature of the present invention is a radio base station including: a receiver unit configured to receive a PDCP-PDU with a PDCP-SN added as a header at a PDCP layer from a mobile station; and a transmitter unit configured to transmit the PDCP-PDU at the PDCP layer to the mobile station. The receiver unit is configured to, if the PDCP-SN added as the header to the received PDCP-PDU exists in a receive window, perform deciphering processing on the PDCP-PDU by using a COUNT value composed by an HFN and the PDCP-SN, and the transmitter unit is configured to, if a predetermined trigger is detected, send the mobile station the HFN or the COUNT value most recently used in the deciphering processing on the PDCP-PDU.

A fifth feature of the present invention is a radio base station including: a receiver unit configured to receive a PDCP-PDU with a PDCP-SN added as a header at a PDCP layer from a mobile station; and a transmitter unit configured to transmit the PDCP-PDU at the PDCP layer to the mobile station. The receiver unit is configured to, if the PDCP-SN given as the header to the received PDCP-PDU exists in a receive window, perform deciphering processing on the PDCP-PDU by using a COUNT value composed by an HFN and the PDCP-SN, and the transmitter unit is configured to, if a predetermined trigger is detected, send the mobile station the HFN or the COUNT value to be used in the deciphering processing on the next PDCP-PDU.

A sixth feature of the present invention is a radio base station including: a receiver unit configured to receive a PDCP-PDU with a PDCP-SN added as a header at a PDCP layer from a mobile station; and a transmitter unit configured to transmit the PDCP-PDU at the PDCP layer to the mobile station. The receiver unit is configured to, if the PDCP-SN given as the header to the received PDCP-PDU exists in a receive window, perform deciphering processing on the PDCP-PDU by using a COUNT value composed by an HFN and the PDCP-SN, and the transmitter unit is configured to, if a predetermined trigger is detected, send the mobile station the HFN or the COUNT value to be used in the deciphering processing on the PDCP-PDU with the PDCP-SN assigned to a lower edge or upper edge of the receive window.

BRIEF DESCRIPTION OF THE DRAWINGS

FIG. 3 is a diagram for explaining an operation of the mobile communication system according to the first embodiment of the present invention.

FIG. 4 is a flowchart illustrating an operation of the mobile station according to the first embodiment of the present invention.

FIG. 5 is a diagram for explaining a conventional mobile communication system.

FIG. 6 is a diagram for explaining the conventional mobile communication system.

MODE FOR CARRYING OUT THE INVENTION (Mobile Communication System According to First Embodiment of the Present Invention)

A mobile communication system according to a first embodiment of the present invention is described in reference to FIGS. 1 to 4.

An LTE-Advanced mobile communication system is explained as an example of a mobile communication system according to this embodiment. However, the present invention is not limited to such mobile communication system, but is applicable to any other types of mobile communication systems.

Figure 1:
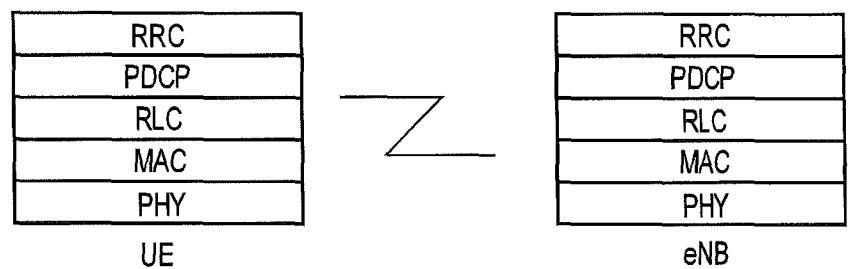
FIG. 1 is a diagram illustrating protocol stacks in a mobile station and a radio base station constituting a mobile communication system according to a first embodiment of the present invention.

As illustrated in FIG. 1, a mobile station UE and a radio base station eNB according to this embodiment are each provided with a physical (PHY) layer, a MAC (Media Access Control) layer, an RLC layer, a PDCP layer and an RRC layer.

Figure 2:
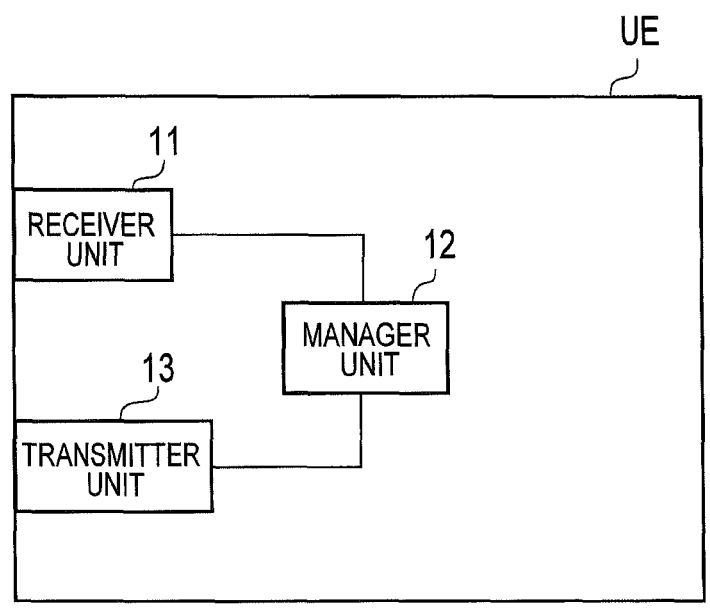
FIG. 2 is a functional block diagram of the mobile station according to the first embodiment of the present invention.
Figure 7:
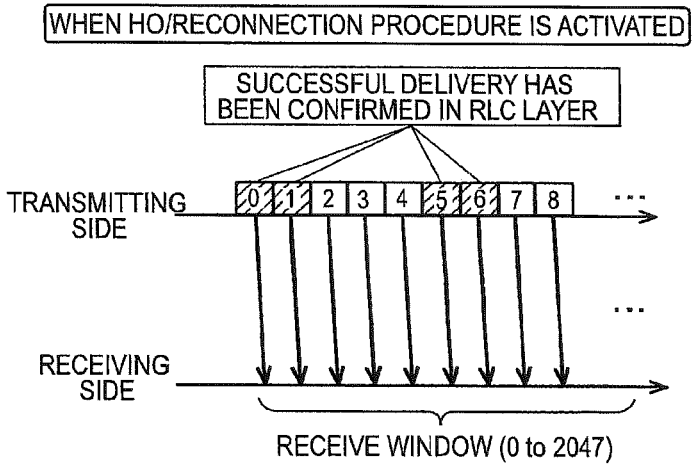
FIG. 7 is a diagram for explaining the conventional mobile communication system.
Figure 8:
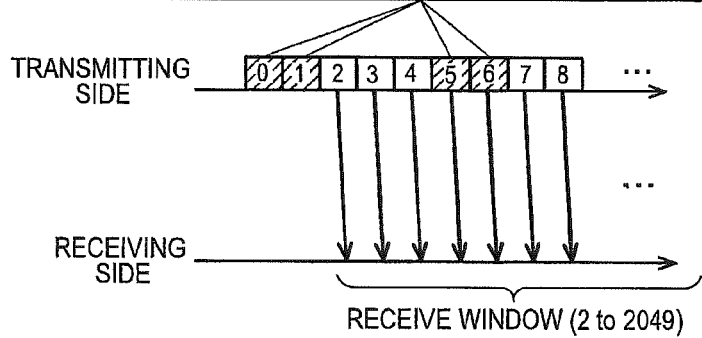
FIG. 8 is a diagram for explaining the conventional mobile communication system.
Figure 9:
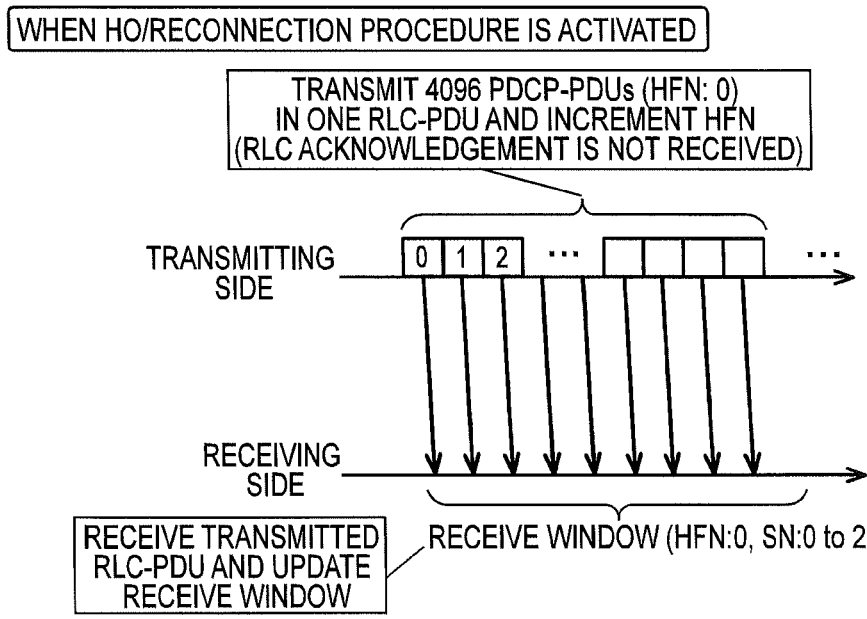
FIG. 9 is a diagram for explaining the conventional mobile communication system.
Figure 10:
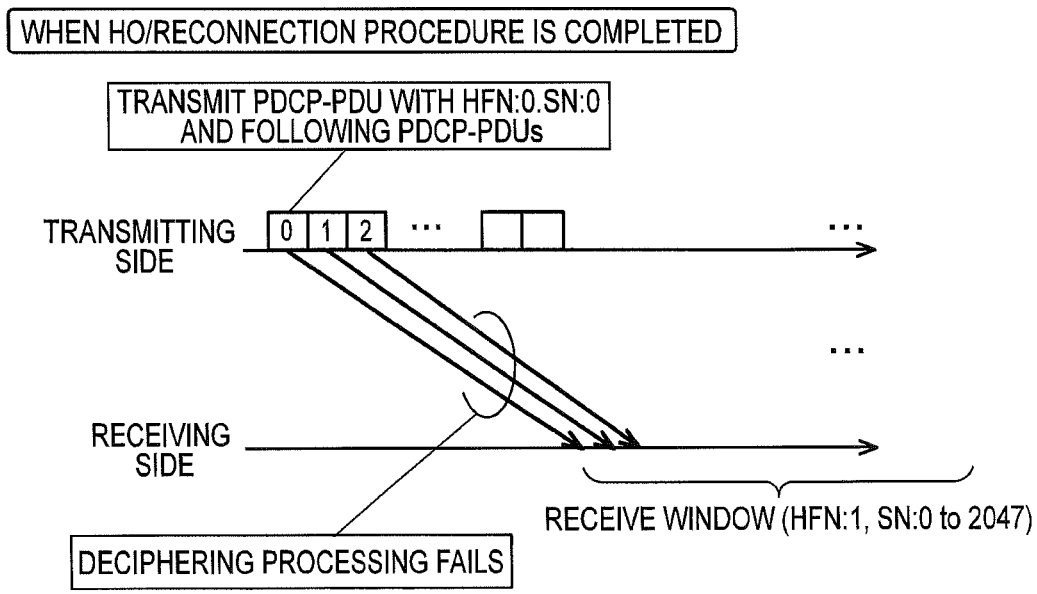
FIG. 10 is a diagram for explaining the conventional mobile communication system.

As illustrated in FIG. 2, the mobile station UE according to this embodiment includes a receiver unit 11, a manager unit 12, and a transmitter unit 13.

The receiver unit 11 is configured to receive PDCP-PDUs (downlink data) at the PDCP layer from the radio base station eNB, where each PDCP-PDU is given a PDCP-SN as the header.

The manager unit 12 is configured to manage a receive window. To be more specific, the manager unit 12 is configured to manage the PDCP-SNs assigned to upper and lower edges of the receive window.

Moreover, the manager unit 12 is configured to manage at least one of the HFN most recently used in the deciphering processing on a PDCP-PDU, the HFN to be used in the deciphering processing on the next PDCP-PDU, and the HFN to be used in the deciphering processing on the PDCP-PDU with the PDCP-SN assigned to the lower edge (or upper edge) of the receive window.

The transmitter unit 13 is configured to transmit PDCP-PDUs at the PDCP layer to the radio base station eNB.

Here, the receiver unit 11 is configured to, if the PDCP-SN given as the header to the PDCP-PDU received by the receiver unit 11 exists in the receive window managed by the manager unit 12, perform the deciphering processing on the next PDCP-PDU by using the COUNT value composed by the PDCP-SN and the HFN managed by the manager unit 12 as the HFN to be used in the deciphering processing on the next PDCP-PDU.

Moreover, the transmitter unit 13 is configured to, if an HFN report trigger (predetermined trigger) is detected, send the radio base station eNB the HFN or the COUNT value most recently used in the deciphering processing on the PDCP-PDU.

Instead, the transmitter unit 13 may be configured to, if the HFN report trigger is detected, send the radio base station eNB the HFN or the COUNT value to be used in the deciphering processing on the next PDCP-PDU.

Alternatively, the transmitter unit 13 may be configured to, if the HFN report trigger is detected, send the radio base station eNB the HFN or the COUNT value to be used in the deciphering processing on the PDCP-PDU with the PDCP-SN assigned to the lower edge (or upper edge) of the receive window.

Here, the transmitter unit 13 may be configured to transmit at least one of the aforementioned HFNs or COUNT values to the radio base station eNB by way of a "PDCP Status Report", dedicated PDCP signaling or the like.

Instead, the transmitter unit 13 may be configured to transmit at least one of the aforementioned HFNs or COUNT values to the radio base station eNB at another layer such as the RRC layer, the RLC layer, the MAC layer or the physical layer.

Additionally, as illustrated in FIG. 3, the transmitter unit 13 may be configured to judge that the HFN report trigger is detected when regular timing arrives, and to transmit at least one of the aforementioned HFNs or COUNT values to the radio base station eNB.

Instead, the transmitter unit 13 may be configured to judge that the HFN report trigger is detected when the transmitter unit 13 is requested from the radio base station eNB, and to transmit at least one of the aforementioned HFNs or COUNT values to the radio base station eNB.

Alternatively, the transmitter unit 13 may be configured to judge that the HFN report trigger is detected when the handover procedure or the reconnection procedure is activated, and to transmit at least one of the aforementioned HFNs or COUNT values to the radio base station eNB.

Or else, the transmitter unit 13 may be configured to judge that the HFN report trigger is detected when the regular timing arrives while a "ProhibitTimer" is not running (or is expired), and to transmit at least one of the aforementioned HFNs or COUNT values to the radio base station eNB.

Instead, the transmitter unit 13 may be configured to judge that the HFN report trigger is detected when the transmitter unit 13 is requested from the radio base station eNB while the "ProhibitTimer" is not running (or is expired), and to transmit at least one of the aforementioned HFNs or COUNT values to the radio base station eNB.

Otherwise, the transmitter unit 13 may be configured to judge that the HFN report trigger is detected when the handover procedure or the reconnection procedure is activated while the "ProhibitTimer" is not running (or is expired), and to transmit at least one of the aforementioned HFNs or COUNT values to the radio base station eNB.

Here, the "ProhibitTimer" may be configured to be set by the radio base station eNB.

Hereinafter, an operation of the mobile station UE according to this embodiment is described in reference to FIG. 4.

As illustrated in FIG. 4, in step S101, the mobile station UE judges whether the HFN report trigger is detected or not.

This operation proceeds to step S102 if "YES," or the operation ends if "NO."

In step S102, the mobile station UE transmits at least one of the aforementioned HFNs or COUNT values to the radio base station eNB.

In the invention according to this embodiment, the mobile station UE is configured to, when detecting the HFN report trigger, send the radio base station eNB at least one of the HFN (or the COUNT value) most recently used in the deciphering processing on the PDCP-PDU, the HFN (or the COUNT value) to be used in the deciphering processing on the next PDCP-PDU, and the HFN (or the COUNT value) to be used in the deciphering processing on the PDCP-PDU with the PDCP-SN assigned to the lower edge (or upper edge) of the receive window. This enables avoidance of a situation where a mismatch occurs between the HFN used in the PDCP layer of the radio base station eNB (transmitting side) and the HFN used in the PDCP layer of the mobile station UE (receiving side).

(Modified Example 1)

It should be noted that a radio base station eNB may have the same function as that of the mobile station UE in the first embodiment.

In the invention according to this embodiment, the radio base station eNB is configured to, when detecting the HFN report trigger, send the mobile station UE at least one of the HFN (or the COUNT value) most recently used in the deciphering processing on the PDCP-PDU, the HFN (or the COUNT value) to be used in the deciphering processing on the next PDCP-PDU, and the HFN (or the COUNT value) to be used in the deciphering processing on the PDCP-PDU with the PDCP-SN assigned to the lower edge (or upper edge) of the receive window. This enables avoidance of a situation where a mismatch occurs between the HFN used in the PDCP layer of the mobile station UE (transmitting side) and the HFN used in the PDCP layer of the radio base station eNB (receiving side).

The foregoing features of this embodiment can be expressed as follows.

A first feature of this embodiment is a mobile station UE including: a receiver unit 11 configured to receive a PDCP-PDU with a PDCP-SN added as a header at a PDCP layer from a radio base station eNB; and a transmitter unit 13 configured to transmit a PDCP-PDU at the PDCP layer to the radio base station eNB. The receiver unit 11 is configured to, if the PDCP-SN added as the header to the received PDCP-PDU exists in a receive window, perform deciphering processing on the PDCP-PDU by using a COUNT value composed by an HFN and the PDCP-SN. The transmitter unit 13 is configured to, if an HFN report trigger (predetermined trigger) is detected, send the radio base station eNB the HFN or the COUNT value most recently used in the deciphering processing on the PDCP-PDU.

A second feature of this embodiment is a mobile station UE including: a receiver unit 11 configured to receive a PDCP-PDU with a PDCP-SN added as a header at a PDCP layer from a radio base station eNB; and a transmitter unit 13 configured to transmit a PDCP-PDU at the PDCP layer to the radio base station eNB. The receiver unit 11 is configured to, if the PDCP-SN added as the header to the received PDCP-PDU exists in a receive window, perform deciphering processing on the PDCP-PDU by using a COUNT value composed by an HFN and the PDCP-SN. The transmitter unit 13 is configured to, if an HFN report trigger is detected, send the radio base station eNB the HFN or the COUNT value to be used in the deciphering processing on the next PDCP-PDU.

A third feature of this embodiment is a mobile station UE including: a receiver unit 11 configured to receive a PDCP-PDU with a PDCP-SN added as a header at a PDCP layer from a radio base station eNB; and a transmitter unit 13 configured to transmit a PDCP-PDU at the PDCP layer to the radio base station eNB. The receiver unit 11 is configured to, if the PDCP-SN added as the header to the received PDCP-PDU exists in a receive window, perform deciphering processing on the PDCP-PDU by using a COUNT value composed by an HFN and the PDCP-SN. The transmitter unit 13 is configured to, if an HFN report trigger is detected, send the radio base station eNB the HFN or the COUNT value to be used in the deciphering processing on a PDCP-PDU with a PDCP-SN assigned to a lower edge or an upper edge of the receive window.

A fourth feature of this embodiment is a radio base station eNB including: a receiver unit 11 configured to receive a PDCP-PDU with a PDCP-SN added as a header at a PDCP layer from a mobile station UE; and a transmitter unit 13 configured to transmit a PDCP-PDU at the PDCP layer to the mobile station UE. The receiver unit 11 is configured to, if the PDCP-SN added as the header to the received PDCP-PDU exists in a receive window, perform deciphering processing on the PDCP-PDU by using a COUNT value composed by an HFN and the PDCP-SN. The transmitter unit 13 is configured to, if an HFN report trigger is detected, send the mobile station UE the HFN or the COUNT value most recently used in the deciphering processing on the PDCP-PDU.

A fifth feature of this embodiment is a radio base station eNB including: a receiver unit 11 configured to receive a PDCP-PDU with a PDCP-SN added as a header at a PDCP layer from a mobile station UE; and a transmitter unit 13 configured to transmit a PDCP-PDU at the PDCP layer to the mobile station UE. The receiver unit 11 is configured to, if the PDCP-SN added as the header to the received PDCP-PDU exists in a receive window, perform deciphering processing on the PDCP-PDU by using a COUNT value composed by an HFN and the PDCP-SN. The transmitter unit 13 is configured to, if an HFN report trigger is detected, send the mobile station UE the HFN or the COUNT value to be used in the deciphering processing on the next PDCP-PDU.

A sixth feature of this embodiment is a radio base station eNB including: a receiver unit 11 configured to receive a PDCP-PDU with a PDCP-SN added as a header at a PDCP layer from a mobile station UE; and a transmitter unit 13 configured to transmit a PDCP-PDU at the PDCP layer to the mobile station UE. The receiver unit 11 is configured to, if the PDCP-SN added as the header to the received PDCP-PDU exists in a receive window, perform deciphering processing on the PDCP-PDU by using a COUNT value composed by an HFN and the PDCP-SN. The transmitter unit 13 is configured to, if an HFN report trigger is detected, send the mobile station UE the HFN or the COUNT value to be used in the deciphering processing on a PDCP-PDU with a PDCP-SN assigned to a lower edge or an upper edge of the receive window.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE or the radio base station eNB. Otherwise, the storage medium and the processor may be provided as discrete components inside the mobile station UE or the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-055767 (filed on Mar. 13, 2012) is incorporated by reference in the present specification.

INDUSTRIAL APPLICABILITY

As described above, according to the present invention, it is possible to provide a mobile station and a radio base station each capable of preventing a mismatch between an HFN used in the PDCP layer on a transmitting side and an HFN used in the PDCP layer on a receiving side, and thereby avoiding a decrease in the throughput due to a failure in deciphering processing on PDCP-PDUs in the PDCP layer on the receiving side.

EXPLANATION OF THE REFERENCE NUMERALS

UE mobile station
eNB radio base station
11 receiver unit
12 manager unit
13 transmitter unit

The invention claimed is:

1. A mobile station comprising:
a receiver unit configured to receive a PDCP (Packet Data Convergence Protocol)-PDU with a PDCP-SN added as a header at a PDCP layer from a radio base station; and
a transmitter unit configured to transmit the PDCP-PDU at the PDCP layer to the radio base station, wherein
the receiver unit is configured to, if the PDCP-SN added as the header to the received PDCP-PDU exists in a receive window, perform deciphering processing on the PDCP-PDU by using a COUNT value composed by an HFN (Hyper Frame Number) and the PDCP-SN,
the transmitter unit is configured to send the radio base station the HFN or the COUNT value most recently used in the deciphering processing on the PDCP-PDU, when regular timing arrives, when the transmitter unit is requested from the radio base station, when a handover procedure or a reconnection procedure is activated, when the regular timing arrives while a ProhibitTimer is not running, when the transmitter unit is requested from the radio base station while the ProhibitTimer is not running, or when the handover procedure or the reconnection procedure is activated while the ProhibitTimer is not running.

2. A radio base station comprising:
a receiver unit configured to receive a PDCP (Packet Data Convergence Protocol)-PDU with a PDCP-SN added as a header at a PDCP layer from a mobile station; and
a transmitter unit configured to transmit the PDCP-PDU at the PDCP layer to the mobile station, wherein
the receiver unit is configured to, if the PDCP-SN added as the header to the received PDCP-PDU exists in a receive window, perform deciphering processing on the PDCP-PDU by using a COUNT value composed by an HFN (Hyper Frame Number) and the PDCP-SN, and the transmitter unit is configured to send the mobile station the HFN or the COUNT value most recently used in the deciphering processing on the PDCP-PDU, when regular timing arrives, when the transmitter unit is requested from the mobile station, when a handover procedure or a reconnection procedure is activated, when the regular timing arrives while a ProhibitTimer is not running, when the transmitter unit is requested from the mobile station while the ProhibitTimer is not running, or when the handover procedure or the reconnection procedure is activated while the ProhibitTimer is not running.

* * * * *